United States Patent Office 3,037,373
Patented June 5, 1962

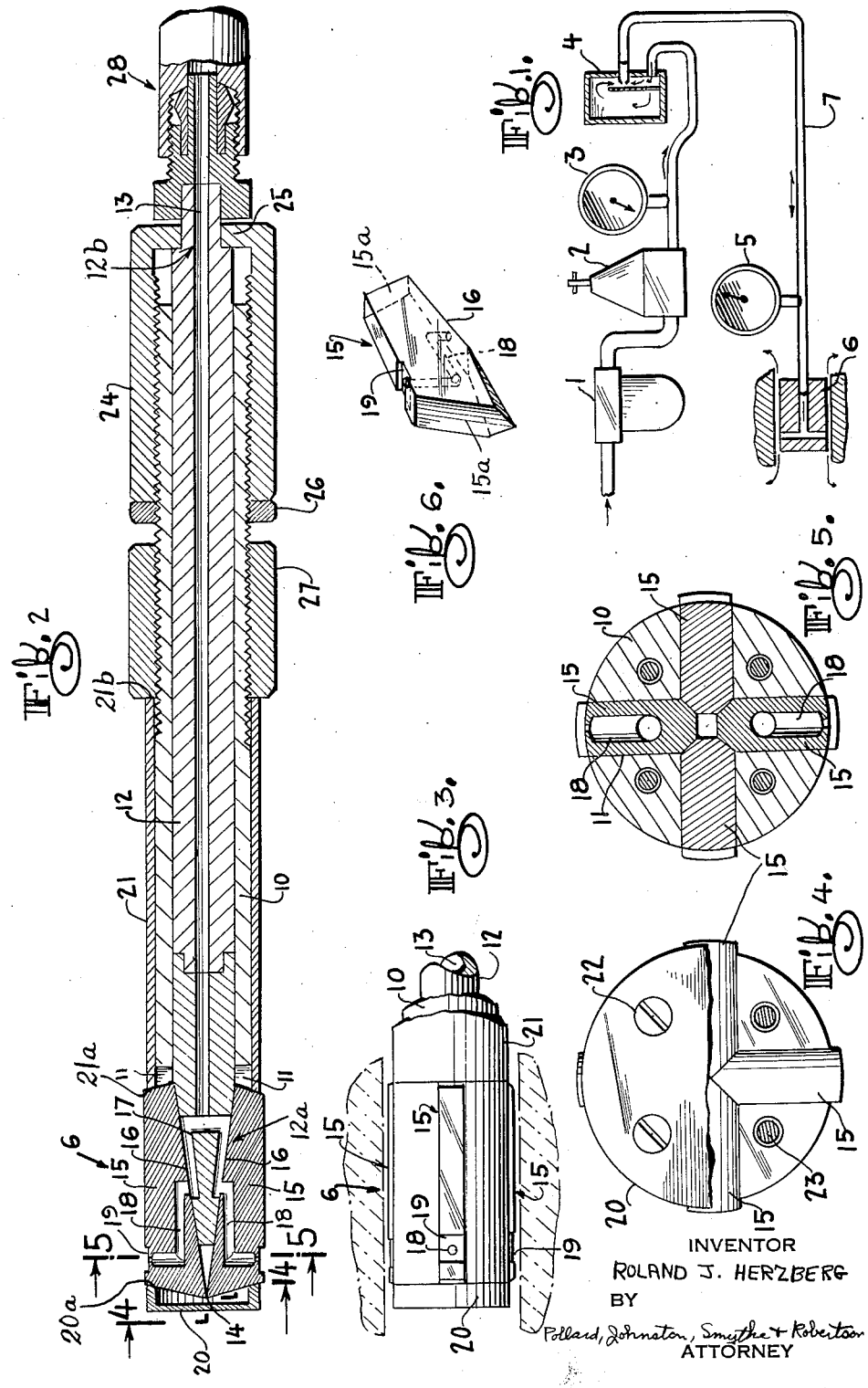

3,037,373
AIR GAUGE HAVING ADJUSTABLE BLADES
Roland J. Herzberg, Davenport, Iowa, assignor to Ametek, Inc., a corporation of Delaware
Filed July 23, 1957, Ser. No. 673,646
5 Claims. (Cl. 73—37.9)

This invention relates to air gauging systems or the like, and particularly to the means for adjusting the measuring head and to the means for adjusting the resistance orifice.

In the past, no practical means for adjusting the position of the air orifices in the measuring head relative to the work being measured has been found. It has long been known that in order to measure work in an air gauge system and obtain a significant degree of accuracy in the measurement, the distance between the air orifice on the measuring head and the work being measured must be relatively small.

One of the objects of this invention is to make the blades mounted in the measuring head movable radially inwardly and outwardly to allow for the use of a single measuring head to measure a plurality of workpieces having different diameters.

Another factor which can affect the accuracy of the measuring device is the pressure of the air through the system. If the pressure is low and the distance between the workpiece and the measuring head is large, the measurement obtained by an air gauge system will be practically useless.

Another object of this invention, therefore, is the provision of a novel adjustable restriction orifice which, when utilized in conjunction with the novel measuring head of this invention, will allow the use of the combined air gauge system of this invention with a plurality of workpieces having a relatively large difference in their diameters.

Still another object of this invention is the provision of a restriction member which can be adjusted preliminarily in accordance with the pressure of the air entering the system and can be further adjusted by other means to compensate for differences in the diameters of the workpieces to be measured.

According to the invention, an air gauging system is provided which comprises a source of air under pressure, a pressure regulator, an adjustable gauging member, an adjustable restriction member interposed between the pressure regulator and the gauging member, indicating means and conduit means connecting the various elements of the measuring device. The novel gauging member of the invention comprises a body member having slots in one end, a shaft mounted in the body member and having tapered portions at said end, a plurality of tapered segments adapted to fit in the slots, means for holding the segments in contact with the shaft, means for moving the shaft longitudinally so as to cause all of the segments to move radially inwardly and outwardly in the slots and means for locking the segments in their adjusted positions. The novel restriction member of the invention comprises a fixed member with inlet and outlet ports, a plurality of flappers having different physical characteristics and a supporting means for the flappers which is movable relative to the fixed member for selective positioning of the flappers adjacent the outlet port in order to control the flow of air to said port.

These and other objects, features and advantages of the invention will become apparent from the following detailed description and drawings which are merely exemplary.

In the drawings:

FIG. 1 is a schematic view of an air gauge system containing certain of the features of the invention;

FIG. 2 is a side elevation in cross section of the novel measuring head of the invention;

FIG. 3 is a top plan view of the operating portion of the measuring head;

FIG. 4 is a view taken along the line 4—4 of FIG. 2 looking in the direction of the arrows;

FIG. 5 is a view taken along the line 5—5 of FIG. 2 looking in the direction of the arrows; and FIG. 6 is a perspective view of one of the blades of the measuring head.

As shown in FIG. 1, the preferred air gauging system of the invention comprises a source of air (not shown), a filter 1 for purifying the air, a pressure regulator 2, a pressure gauge 3, an adjustable restriction orifice 4, a pressure gauge 5, a measuring head 6 and an air conduit 7 connecting all of the elements to allow for the flow of air through the system. The provision for an adjustable restriction orifice and an adjustable measuring head in the same system allows for a great deal of flexibility in the size of the workpieces which can be measured by the system.

The Measuring Head

FIG. 2 will be used throughout this description to define the left and right ends of the measuring head.

The measuring head 6 has a main tubular body portion 10 having slots 11 in the left-hand end. Mounted within the measuring head for longitudinal movement relative thereto is a shaft 12 having an air bore 13 throughout most of its length. The shaft includes a tapered portion 12a at its left-hand end which is squared, and all of its faces at said end are tapered toward a point 14. Four blades 15 are mounted in the slots 11. The base portion 16 of each of the blades is tapered upwardly from left to right, except for the extreme left-hand portion which is substantially horizontal and which is V-shaped, as best seen in FIG. 6, to allow for proper nesting of the four blades as seen in FIG. 4. The squared tapered portion 12a of the shaft mates with all of the blades so that when the shaft is moved to the left, all of the blades are moved outwardly with respect to the main body. The shaft terminates prior to the point where the blades become V-shaped. The air bore in the shaft is connected to air slots 17 in two of the faces of the squared portion of the shaft. These slots are elongated so as to always be in alignment with the air bores 18 in the corresponding blades regardless of how far the shaft is moved to the left or right. The outer surfaces of the two blades 15 having the air bores are provided with notches 19 to allow for the escape of air. The blades also have their edges or ends 15a slanted inwardly toward the outer surface of the main body so as to mate with the oppositely slanted peripheral edges or ends 20a and 21a respectively, of cap 20 and sleeve 21. The cap is connected to the main body by screws 22 screwed into threaded holes 23 in the main body. The sleeve is mounted on the outer surface of the main body and is movable therealong. At the other end of the main body is a blade adjusting nut 24 threadingly connected to the outer surface of the main body and having an inwardly directing flange portion 25 which contacts the right-hand end 12b of shaft 12. Lock nut 26 is provided to hold nut 24 in its adjusted position. A locking nut 27 is also provided to engage end 21b and to hold sleeve 21 against blades 15 in their adjusted position. The measuring head is connected to the rest of the air gauge system by suitable connecting means designated generally as 28.

The adjustment of the blades of the measuring head is as follows: Nut 27 is loosened allowing the blades 15 to be freely movable radially in the slots 11. Then, assuming that it is desired to move the blades outwardly relative to the main body, lock nut 26 is loosened, nut 24 is turned toward the left, thereby moving shaft 12 toward the left. The action of the tapered portion of the shaft upon the tapered portion of the blades 15 forces the blades outwardly and forwardly, but the forward movement of the blades is stopped by cap 20; therefore, the blades move only outwardly. When the blades are in their proper position, lock nut 26 is tightened against nut 24 and nut 27 is moved toward the left, so as to force sleeve 21 against the blades and lock the blades against further outward movement due to the inward force exerted by the tapered peripheral edge of the sleeve and the tapered peripheral edge of the cap against the oppositely tapered ends of the blades. To move the blades inward again, all of the nuts are loosened, the blades are shaken or pushed into the desired position and the locking nuts 26 and 27 are tightened.

It is to be understood that details of construction can be varied without departing from the spirit of the invention, except as defined in the appended claims.

What is claimed is:

1. A gauging member for use in a measuring device, said gauging member being adjustable to correspond with the dimension of the work to be gauged and comprising a fixed tubular body member, a shaft mounted within said body member for longitudinal sliding movement relative thereto, segmental parts mounted in said body member for sliding movement in a radial direction relative thereto, said segmental parts having their ends slanted inwardly from their base portion, said body member having an end portion slanted in substantial conformity with one end of said segmental parts, means adjacent said body member for urging said segmental parts at their other end toward said body member end portion and into contact with said shaft, said urging means being slanted in substantial conformity to said other end, means on said shaft for sliding all of said segmental parts outward in said radial direction simultaneously, and means for actuating said last named means, said urging means locking all of the segmental parts in their adjusted position.

2. A gauging member for use in a measuring device, said gauging member being adjustable to correspond with the dimension of the work to be gauged and comprising a fixed tubular body member having a plurality of slots at one end thereof, a shaft mounted within said body member for longitudinal sliding movement relative thereto, said shaft having portions thereof tapered at one end downwardly thereto, a plurality of segments shaped to fit in the slots in the body member and having their base portions tapered oppositely to the taper of said end of the shaft, said segments being slidable in a radial direction relative to said body member in said slots, said segmental parts having their ends slanted inwardly from their base portion, said body member having an end portion slanted in substantial conformity with one end of said segmental parts, means adjacent said body member for urging said segmental parts at their other end toward said body member end portion and into contact with said shaft, said urging means being slanted in substantial conformity to said other end and means for moving said shaft longitudinally with respect to said body member so as to cause all of said segments to move radially outwardly in said slots simultaneously, said urging means locking all of the segments in their adjusted positions.

3. A gauging member for use in a measuring device, said gauging member being adjustable to correspond with the dimension of the work to be gauged and comprising a main tubular body having a plurality of slots at one end thereof, a shaft mounted within said main body for longitudinal sliding movement relative thereto, said shaft having portions thereof tapered at one end downwardly thereto, the tapered portions of said shaft entering the slots in said main body, a plurality of blades shaped to fit in said slots having their base portions tapered in a direction opposite to the taper of the tapered portions of said shaft, said blades being slidable in said slots in a radial direction relative to the main body, said blades having their ends slanted inwardly from their base portion, said body having an end portion slanted in substantial conformity with one end of said blades, means for moving the shaft longitudinally with respect to the main body so as to move all of the blades simultaneously radially outwardly in the slots, a sleeve mounted on the main body and contacting all of the blades at one end thereof, the contacting portion of said sleeve being slanted in substantial conformity to said one end of the blades, and means to lock said sleeve in place against all of the blades so as to lock all of the blades in their adjusted position.

4. A gauging member for use in a measuring device, said gauging member being adjustable to correspond with the dimension of the work to be gauged and comprising a main tubular body having at least two slots at one end thereof, a shaft mounted within the main body for longitudinal sliding movement relative thereto, said shaft having portions tapered downwardly toward one end, the tapered portions of the shaft entering the slots in the main body, at least two blades shaped to fit in said slots and having their base portions tapered in a direction opposite to the taper of the tapered portions of said shaft, one of said blades being mounted in each of the slots and being slidable therein in a radial direction relative to the main body, said blades also having their ends slanted inwardly from the base to the outer surface, a sleeve mounted on said main body and contacting one end of each blade, the peripheral end of said sleeve which contacts the blades being slanted in substantial conformity with the ends of the blades which it contacts, a cap fixedly connected to the main body at said one end and contacting the other ends of the blades, the peripheral end of the cap contacting the blades being slanted in substantial conformity with the ends of the blades which it contacts so that the blades are urged toward the bottoms of their slots by the inward force generated by the action of the slanted end of the cap and the slanted end of the sleeve upon the slanted ends of the blades, a blade adjusting nut threaded to the main body and having a peripheral flange which contacts the other end of said shaft in order to move the shaft in response to the turning of the blade adjusting nut and thus move the blades simultaneously in said radial direction to the desired position, and a blade clamping nut threaded to the main body and having its peripheral portion contacting the other end of the sleeve so that it can force the sleeve against the blades and simultaneously lock the blades in the desired position between the sleeve and the cap.

5. An air gauging member for use in a measuring device, said gauging member being adjustable to correspond with the dimension of the work to be gauged and comprising a main tubular body having at least two slots at one end thereof, a shaft mounted within the main body for longitudinal sliding movement relative thereto, said shaft having portions tapered downwardly toward one end, the tapered portions of the shaft entering the slots in the main body, said tapered portion of the shaft having internal radial passages, said shaft having an axial internal passage intersecting said radial passages, at least two blades shaped to fit in said slots and having their base portions tapered in a direction opposite to the taper of the tapered portions of said shaft, one of said blades being mounted in each of the slots and being slidable therein in a radial direction relative to the main body, said blades containing radially disposed passages extending from adjacent said internal radial passages of said tapered portion of said shaft, said blades also having their ends slanted inwardly from the base to the outer surface, a sleeve mounted on said main body and contacting one end of each blade, the peripheral end of said sleeve which contacts the blades being slanted in substantial conformity with the ends of the blades which it contacts, a cap fixedly connected to the main body at said one end and contacting the other ends of the blades, the peripheral end of the cap contacting the blades being slanted in substantial conformity with the ends of the blades which it contacts so that the blades are urged toward the bottoms of their slots by the inward force generated by the action of the slanted end of the cap and the slanted end of the sleeve upon the slanted ends of the blades, a blade adjusting nut threaded to the main body and having a peripheral flange which contacts the other end of said shaft in order to move the shaft in response to the turning of the blade adjusting nut and thus move the blades simultaneously in said radial direction to the desired position, and a blade clamping nut threaded to the main body and having its peripheral portion contacting the other end of the sleeve so that it can force the sleeve against the blades and simultaneously lock the blades in the desired position between the sleeve and the cap.

References Cited in the file of this patent

UNITED STATES PATENTS

| | | |
|---|---|---|
| 1,595,368 | Volis | Aug. 10, 1926 |
| 1,819,144 | Aulenback | Aug. 18, 1931 |
| 2,105,198 | McNamara | Jan. 11, 1938 |
| 2,219,504 | Willis | Oct. 29, 1940 |
| 2,352,836 | Hertel | July 4, 1944 |
| 2,594,077 | Schultze | Apr. 22, 1952 |
| 2,718,140 | Aller | Sept. 20, 1955 |

FOREIGN PATENTS

| | | |
|---|---|---|
| 32,046 | Denmark | July 30, 1923 |
| 554,054 | Great Britain | June 17, 1943 |
| 655,838 | Great Britain | Aug. 1, 1951 |